(12) United States Patent
Schaefer et al.

(10) Patent No.: US 12,152,633 B2
(45) Date of Patent: Nov. 26, 2024

(54) COMPOSITE DRIVE SHAFTS

(71) Applicant: Hamilton Sundstrand Corporation, Charlotte, NC (US)

(72) Inventors: Joyel M. Schaefer, Earlville, NY (US); Michael King, Sauquoit, NY (US); Brayton Reed, New York Mills, NY (US); Mark R. Gurvich, Middletown, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 73 days.

(21) Appl. No.: 17/872,109

(22) Filed: Jul. 25, 2022

(65) Prior Publication Data
US 2022/0356900 A1 Nov. 10, 2022

Related U.S. Application Data

(62) Division of application No. 16/173,364, filed on Oct. 29, 2018, now Pat. No. 11,396,904.

(51) Int. Cl.
*F16C 3/02* (2006.01)
*F16D 1/027* (2006.01)
(Continued)

(52) U.S. Cl.
CPC .............. *F16C 3/026* (2013.01); *F16C 3/023* (2013.01); *F16D 1/027* (2013.01); *F16D 3/725* (2013.01);
(Continued)

(58) Field of Classification Search
CPC ...... F16C 3/026; F16C 3/023; F16C 2208/02; F16C 2226/36; F16C 2326/06;
(Continued)

(56) References Cited

U.S. PATENT DOCUMENTS

| | | | |
|---|---|---|---|
| 2,195,993 A | * | 4/1940 | Morrill ................... F16D 3/74 |
| | | | 464/80 |
| 3,137,149 A | | 6/1964 | Schlotmann |
| 4,173,128 A | | 11/1979 | Corvelli |
| 4,411,634 A | | 10/1983 | Hammelmann |

(Continued)

FOREIGN PATENT DOCUMENTS

| | | |
|---|---|---|
| CN | 201241910 Y | 5/2009 |
| EP | 0363277 A2 | 4/1990 |

(Continued)

OTHER PUBLICATIONS

Pereira da Costa et al., A Review of Welding Technologies for Thermoplastic Composites in Aerospace Applications, J.Aerosp. Technol. Manag., vol. 4, No. 3, pp. 255-265, Jul.-Sep. 2012, retrieved from the internet on Feb. 2, 2024 at , https:/www.sielo.br/j/jatm>. (Year: 2012).*

(Continued)

*Primary Examiner* — Greg Binda
(74) *Attorney, Agent, or Firm* — Carlson, Gaskey & Olds, P.C.

(57) ABSTRACT

A mechanical system for an aerospace application includes a drive input connected to a first axial end of a first diaphragm member, and a drive output connected to a second axial end of a second diaphragm member. The drive output is an aerospace component. The first and second diaphragm members are formed with two axial ends and at least one undulation extending radially of the axial ends. The at least one undulation is intermediate the ends. A tubular portion connects the first and second diaphragm members. The first and second diaphragm members and the tubular member are formed of fiber reinforced polymer matrix composites. The first and second diaphragm members are connected to axial ends of the tubular member by welding of the axial ends of the tubular portion to one of the inner ends (Continued)

of each of said first and second diaphragm members. The aerospace component is a propeller.

14 Claims, 5 Drawing Sheets

(51) Int. Cl.
*F16D 3/72* (2006.01)
*F16D 1/068* (2006.01)

(52) U.S. Cl.
CPC ...... *F16C 2208/02* (2013.01); *F16C 2226/36* (2013.01); *F16C 2326/06* (2013.01); *F16C 2326/43* (2013.01); *F16D 1/068* (2013.01); *F16D 2200/006* (2013.01); *F16D 2250/0076* (2013.01); *Y10S 138/02* (2013.01); *Y10S 285/919* (2013.01)

(58) Field of Classification Search
CPC ...... F16C 2326/43; F16D 1/027; F16D 3/725; F16D 1/068; F16D 2200/006; F16D 2250/0076; Y10S 138/02; Y10S 285/919
USPC .......................................................... 464/80
See application file for complete search history.

(56) References Cited

U.S. PATENT DOCUMENTS

| | | | |
|---|---|---|---|
| 4,551,116 A * | 11/1985 | Krude | F16C 3/026 |
| 4,624,486 A | 11/1986 | Nishino et al. | |
| 4,792,320 A | 12/1988 | Nickel | |
| 7,143,510 B2 * | 12/2006 | Myers | F16C 3/026 |
| 7,677,980 B2 | 3/2010 | Geislinger et al. | |
| 11,486,439 B2 * | 11/2022 | Gurvich | B64C 27/14 |
| 2008/0064510 A1 | 3/2008 | Geislinger et al. | |
| 2010/0144451 A1 | 6/2010 | Lawrie | |
| 2012/0283029 A1 | 11/2012 | Lawrie | |
| 2016/0305470 A1 | 10/2016 | Remer et al. | |
| 2018/0051753 A1 | 2/2018 | Goeke et al. | |

FOREIGN PATENT DOCUMENTS

| | | |
|---|---|---|
| EP | 0534925 A2 | 3/1993 |
| EP | 2762741 A2 | 8/2014 |
| FR | 2653505 A1 | 4/1991 |
| GB | 2141207 A | 12/1984 |
| GB | 2251051 A | 6/1992 |

OTHER PUBLICATIONS

European Search Report for EP Application No. 19205591.1 dated Mar. 27, 2020.

* cited by examiner

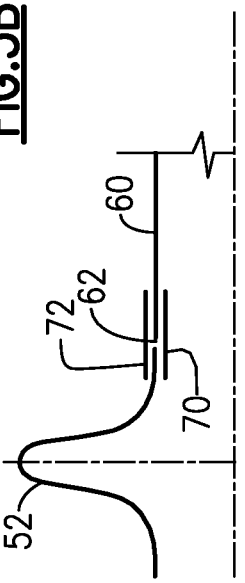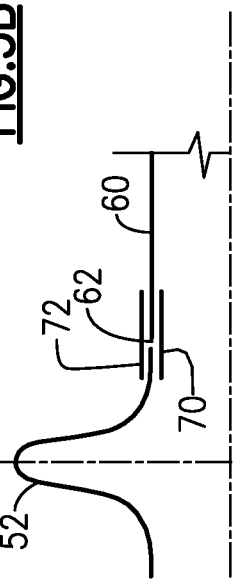

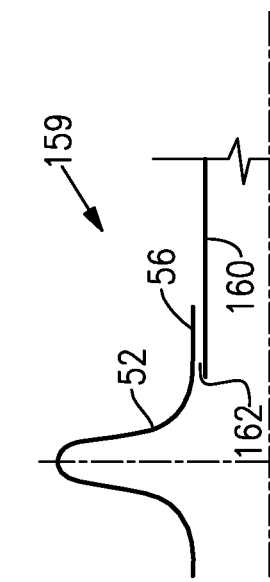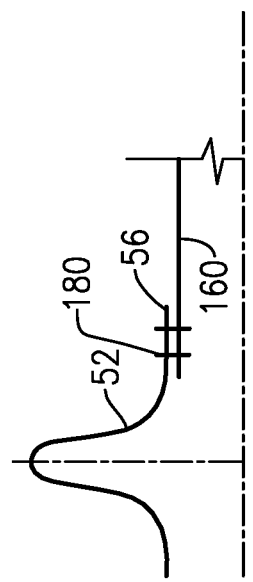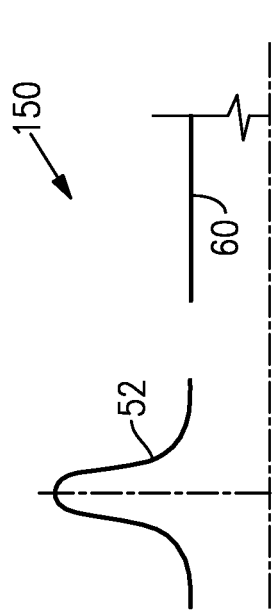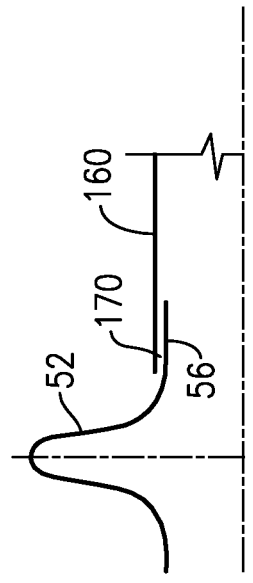

COMPOSITE DRIVE SHAFTS

CROSS-REFERENCE TO RELATED APPLICATIONS

This application is a divisional of U.S. patent application Ser. No. 16/173,364 filed on Oct. 29, 2018, now U.S. Pat. No. 11,396,904 granted Jul. 26, 2022.

BACKGROUND

This application relates to a drive shaft formed of composite materials.

Drive shafts are used to transfer load between drive system components, e.g., parts of engine, gear system, rotor blades, etc.

Drive shafts in modern mechanical systems must be capable of transmitting primarily high torque at high speed and yet are subject to a number of design constraints. As an example, weight is a driving concern for the designer of any number of mechanical systems. In addition, drive shafts must be able to resist, according to specified criteria of structural integrity, the torque load along with other load components, such as, for example, bending and/or axial loads. This must all occur as the relative position of an input shaft and a driven shaft connected by the coupling might flex or otherwise vary.

It is known to have drive shafts including diaphragm members at each connection end of a shaft tube. The diaphragms have an undulation to allow some flexing. A relatively rigid connecting tube connects two diaphragms to provide torsional stiffness.

In the past, it has been known to form such a drive shaft entirely from metallic materials. In addition, it has been proposed to use composites such as fiber-reinforced polymer matrix materials. Two types of composite drive shaft have been proposed. In one type, the tube is formed of composite materials whereas the diaphragms are formed of metallic materials. In another type, the diaphragms and the tube are formed as one integral unit from composite materials.

SUMMARY

A drive shaft is for selectively connecting a drive input to an output. The drive shaft has a tubular portion, a first diaphragm member, and a second diaphragm member displaced axially along the shaft from the first diaphragm member. The first and second diaphragm members each are formed with two axial ends. At least one undulation extends radially of the ends. The tubular portion connects the first and second diaphragm members. The first and second diaphragm members and the tubular portion are formed of fiber-reinforced polymer matrix composites. The first and second diaphragm members are connected to first and second axial ends of the tubular portion through a mechanical connection at joints.

A method of forming a drive shaft is also disclosed.

These and other features may be best understood from the following drawings and specification.

BRIEF DESCRIPTION OF THE DRAWINGS

FIG. 2A shows axisymmetric cross-section of an initial step of method to form a drive shaft.

FIG. 2B shows axisymmetric cross-section of a subsequent step.

FIG. 3A shows axisymmetric cross-section of an alternative connection.

FIG. 3B shows axisymmetric cross-section of another alternative connection.

FIG. 3C shows axisymmetric cross-section of another alternative connection.

FIG. 4A shows axisymmetric cross-section of an initial step of another method embodiment.

FIG. 4B shows axisymmetric cross-section of one variant of the FIG. 4A method.

FIG. 4C shows axisymmetric cross-section of another variant.

FIG. 4D shows axisymmetric cross-section of another variant.

DETAILED DESCRIPTION

Figure 1:
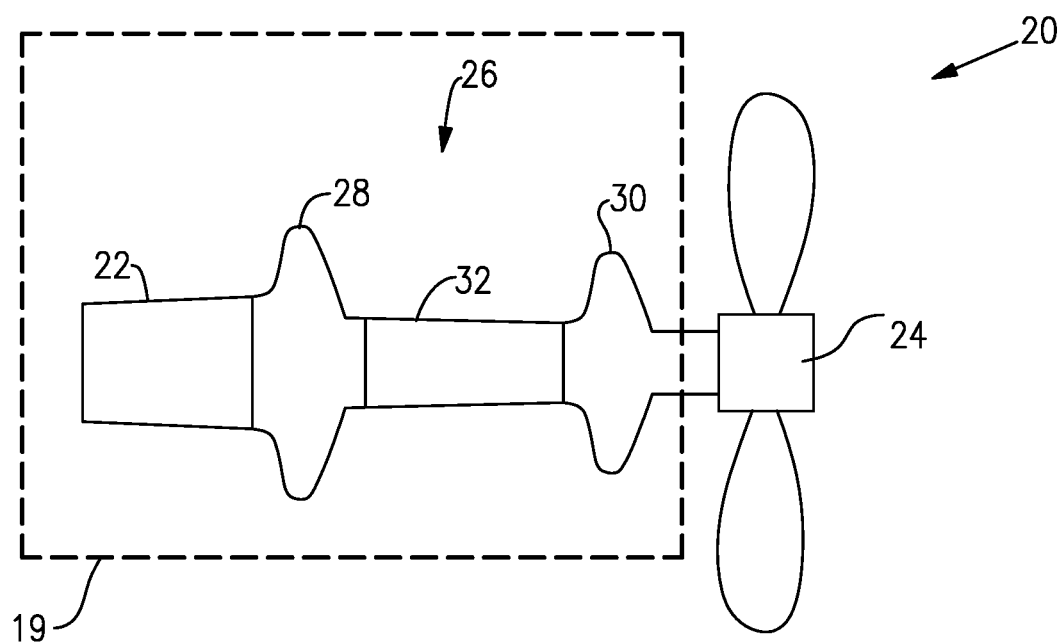
FIG. 1 schematically shows a mechanical drive system.

FIG. 1 shows a schematic side view of mechanical drive system 20 which may be incorporated into a number of applications. The particular disclosed application is an aerospace application 19, shown schematically. Examples include fixed wing aircraft or helicopter applications. A driving input 22, such as, for example, engine or gear system, drives an output 24, illustrated schematically, for example, as a propeller, through a drive coupling 26.

Drive shaft 26 includes a pair of diaphragms 28 and 30 which connect ends of the shaft 26 to the drive input 22 and the output 24. The example drive shafts disclosed are axisymmetric, but other shafts may benefit from this disclosure. As shown, the diaphragms have an undulation that allow low flexural and axial stiffness under bending and/or axial loads applied between center axis of the drive input 22 and output 24. A tube 32 connects the diaphragms 28 and 30, and the entire shaft 26, including the tube 32 and the diaphragms 28 and 30, is relatively stiff under torsional load.

FIG. 2A shows a first step 50 in a method of forming a drive coupling which may be incorporated into the location of drive coupling 26. As shown, the individual diaphragms 52 are formed separately and the tube 60 is formed separately. As mentioned above, there can be one or more undulations 58 in the diaphragm 52 such that there are radially inner ends 54 and 56 and a radially outwardly extending undulation 58. In other embodiments, designs of the diaphragms 52 can be different and can use, at least, one radially inwardly extending undulation either instead of radially outwardly undulation(s) or in combination with them. Again the diaphragms are shown axisymmetric, but non axisymmetric designs of the diaphragms can also be used in other embodiments. In a sense FIG. 2A could be said to illustrate both radially inwardly and radially outwardly extending undulations, depending on perspective.

The components 52 and 60 may be formed of the same or different fiber-reinforced polymer matrix composite materials. In one embodiment, the matrix can be a thermoplastic polymer. In another embodiment, the matrix can be a thermoset polymer. Different types of reinforcing fibers, such as, for example, carbon fibers, glass fibers, organic fibers, or their combinations can be used in different embodiments. In different embodiments, the same or different fabrication processes, such as for example, automated fiber placement, filament winding, braiding, wrapping, etc. can be used to make separate composite tubes and diaphragms.

FIG. 2B shows a subsequent step 50. Now, an area 62 is welded to connect the diaphragm 52 to the tube 60 for composite materials with thermoplastic matrix. The welding process can include steps such as preparation of contact surfaces, application of heat and pressure, and cooling. In different embodiments, typically used welding methods for thermoplastic materials, such as, for example, hot gas welding, speed tip welding, contact welding, hot plate welding, non-contact/infrared welding, high frequency welding can be used. It should be understood that a second diaphragm is attached to an opposed end by similar means to provide a similar load transfer. This composite drive shaft, based on connection of previously fabricated separate composite tube and diaphragms, is provided that is relatively easy to manufacture compared to the prior art method of forming an integral one-piece shaft incorporating both the diaphragms and the shaft during their fabrication.

FIG. 3A shows an alternative, wherein the area 62 may be welded. However, an inner sleeve 70 can also be welded or otherwise secured in place and spans the joint 62 such that axial ends of the sleeve 70 underlie axial ends of the diaphragm 52 and the tube 60. Sleeve 70 (and other sleeves disclosed below) may be formed of a thermoset polymer, as an example, or alternatively materials similar to those used in the diaphragm and tube can be used.

FIG. 3B shows an alternative wherein the sleeve 72 is on a radially outer surface of the shaft.

FIG. 3C shows yet another embodiment wherein there is an inner sleeve 70 and an outer sleeve 72 both spanning the joints 62. The composite sleeves 70 and 72, shown in FIGS. 3A-3B, can be fabricated from the same or different material than the diaphragm 52 and/or tube 60, and can be fabrication using the same or different methods.

FIG. 4A shows an initial step of a distinct method 150 wherein the diaphragm 52 is again formed, however, the tube 160 has a somewhat different diameter than in FIG. 2A.

FIG. 4B shows a subsequent step 159. An axial end 56 of the diaphragm 52 overlies an axial end of the tube 160, such that the mechanical securement, such as by welding or other attachment occurs along the surface 162. Surface 162 is at a radially outer surface of the tube 160, and a radially inner surface of the end 56 of the diaphragm 52.

FIG. 4C shows an alternative wherein the connection 170 is between a radially inner surface of the tube 160 and a radially outer surface of the end 56 of the diaphragm 52.

Figure 4E:
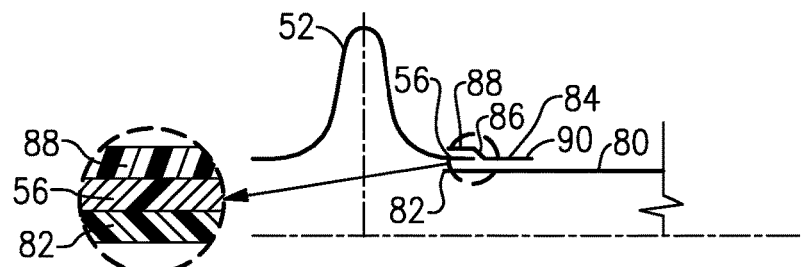
FIG. 4E shows axisymmetric cross-section of another variant.

FIG. 4D shows an alternative wherein radial fasteners, such as for example, pins, rivets, or bolts, 180 secure the diaphragm end 56 to the tube 160. In other embodiments, the tube 160 and the diaphragm 52 can be made of fiber reinforced composite with thermoset matrix. It should be understood that this same type of radial fasteners arrangement could be utilized with the FIG. 4C positioning. The same radial fasteners arrangement can also complement the above-mentioned solutions shown in FIGS. 3A-3C and FIGS. 4E-4G, shown below.

FIG. 4E shows an embodiment wherein the end 82 of the tube 80 is within the end 56 of the diaphragm 52. However, an outer sleeve 84 is provided having a radially inward step 90 secured to the outer surface of the shaft 80. A ramp 86 and a radially outer step 88 are secured radially outwardly of the end 56.

Figure 4F:
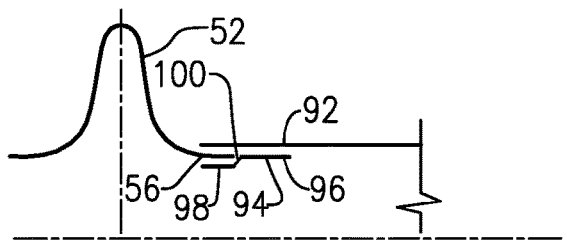
FIG. 4F shows axisymmetric cross-section of another variant.

FIG. 4F shows basically a mirror to the FIG. 4E embodiment. Here, the tube 92 extends radially outwardly of the end 56 and the sleeve 94 has the radially outer step 96 secured to the inner surface of the shaft 92. Ramp 100 leads to a radially inner step 98 secured to a radially inner surface of the end 56 of the diaphragm 52.

Figure 4G:
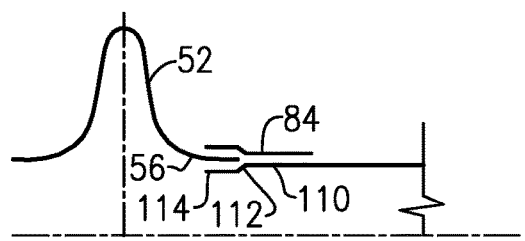
FIG. 4G shows axisymmetric cross-section of another variant.

FIG. 4G shows an embodiment wherein there is a sleeve 84 radially outwardly of the end 56 and the tube 110 has a ramp 112 leading into a radially inner step 114, which is secured to a radially inner surface of the end 56 of the diaphragm 52.

The composite sleeves 84 and 94, shown in FIGS. 4E-4G, can be fabricated from the same or different material than the diaphragm 52 and/or tube 60, and can be fabrication using the same or different methods (as an example thermoset polymers may be used).

Figure 5:
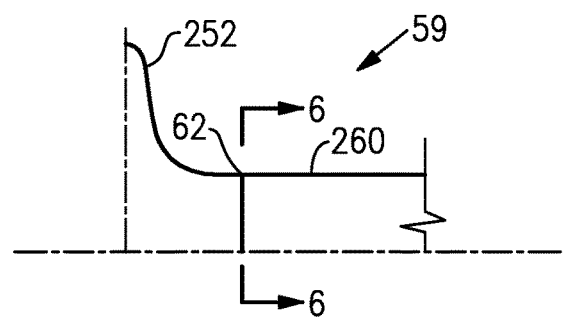
FIG. 5 shows side view of another embodiment.

FIG. 5 schematically shows a side view of diaphragm 252 secured to a tube 260 at the joint 62. A cross-section 6-6 extends through a radial thickness of the connection.

Figure 6A:
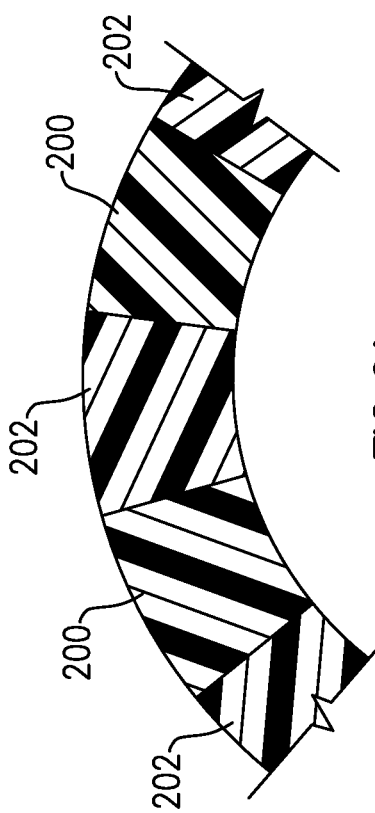
FIG. 6A is a partial radial cross-sectional view along section 6-6 of FIG. 5.

As shown in FIG. 6A, there could be interspersed teeth 200 and 202 between the diaphragm 252 and the tube 260.

Figure 6B:
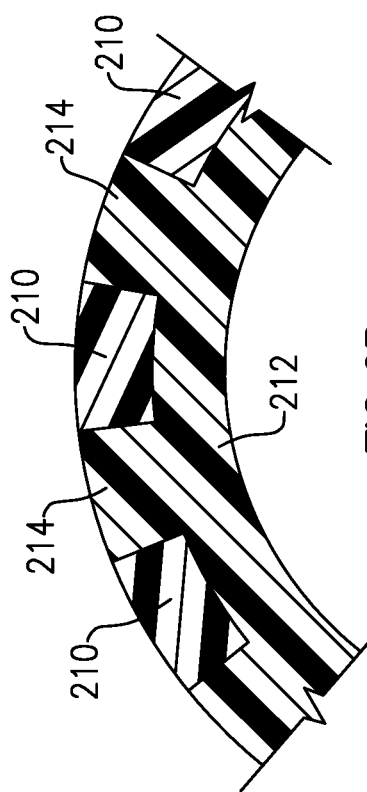
FIG. 6B is a partial radial cross-sectional view along section 6-6 of FIG. 5.
Figure 6C:
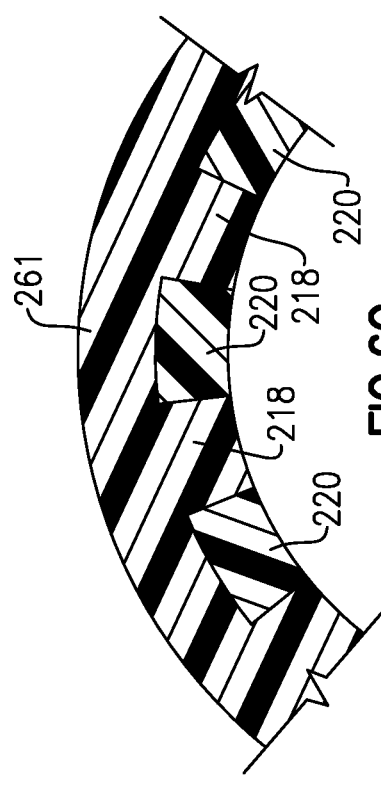
FIG. 6C is a partial radial cross-sectional view along section 6-6 of FIG. 5.

FIG. 6B shows an alternative wherein there are inside teeth 214 as a component of inside part 212 of the shaft 260 interspersed with outside teeth 210 from the diaphragm. Similar implementation can be in other embodiments where shaft is inside and the diaphragm is outside or if an inner sleeve is used FIG. 6C shows a mirror to the FIG. 6B embodiment wherein the outside portion 261 is formed with the diaphragm 252 and the inside teeth 218 and 220 are again interspersed in the radial direction. Similar implementation can be in other embodiments where diaphragm is inside and the shaft is outside or if an outer sleeve is used.

Figure 6D:
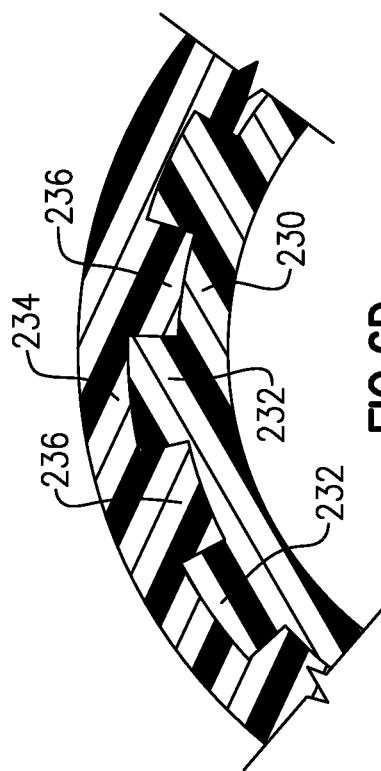
FIG. 6D is a partial radial cross-sectional view along section 6-6 of FIG. 5.

FIG. 6D shows an embodiment where both the diaphragm 234 and shaft 236 both have the external portions 230 and 234 and the spaced teeth 232 and 236. Similar implementation can be in other embodiments where diaphragm is inside and the shaft is outside or if an inner or/and outer sleeves are used.

Figure 7:
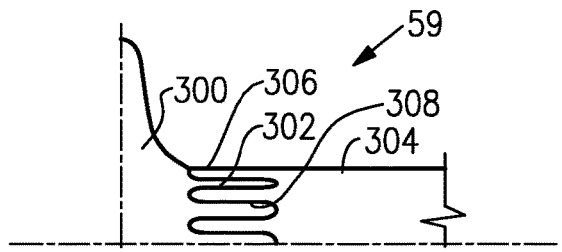
FIG. 7 shows side view of yet another embodiment.

FIG. 7 shows a side view of embodiments illustrating examples shown in FIG. 6A or 6B. Here, the shaft 304 is connected to the diaphragm 300 at a joint with circumferentially spaced teeth 302 on the diaphragm 300 and teeth 306 on the tube 308, and fitting into grooves 308 and 310 on the tube and diaphragm, respectively. Here the teeth and grooves can have ends with uniformly or non-uniformly curved shapes.

Figure 8:
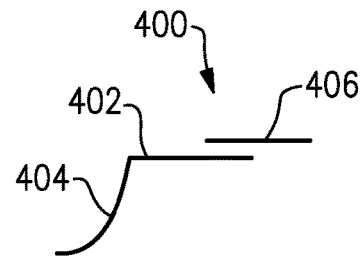
FIG. 8 shows a further option.

FIG. 8 shows an embodiment 400 where the diaphragm 402 has an undulations 404 extending radially inwardly. The tubular member 406 is also shown.

All of the several embodiments provide alternative for ensuring a secure connection between the diaphragms and the tube. The resulting composite drive shaft will achieve weight reduction compared to the prior art, simplify manufacture and assembly, and allow a designer great freedom in achieving design goals.

A method of forming a drive shaft includes the steps of forming a first and second diaphragm. A tube is separately formed. The first and second diaphragms and the tube are formed of a fiber-reinforced polymer-matrix composite. One end of each of the first and second diaphragms is mechanically connected to first and second ends of the tube.

A drive shaft for selectively connecting a drive input to an output could be said to include a tubular portion, a first diaphragm member, and a second diaphragm member displaced axially along the shaft from the first diaphragm member. The first and second diaphragm members each are formed with two axial ends. At least one undulation extends radially of the ends. The tubular portion connects the first and second diaphragm members. The first and second diaphragm members and the tubular portion are formed of fiber-reinforced polymer matrix composites. The first and second diaphragm members connect to first and second axial ends of the tubular portion through a mechanical connection at joints.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A mechanical system for an aerospace application comprising:
    a drive input connected to a first axial end of a first diaphragm member, and a drive output connected to a second axial end of a second diaphragm member, and said drive output is an aerospace component;
    said first and second diaphragm members being formed with two axial ends and at least one undulation extending radially of said axial ends, and said at least one undulation being intermediate said ends, and a tubular portion connecting said first and second diaphragm members, said first and second diaphragm members and said tubular member being formed of fiber reinforced polymer matrix composites, and said first and second diaphragm members being connected to axial ends of said tubular member;
    joints formed by welding of said axial ends of said tubular portion to one of said inner ends of each of said first and second diaphragm members; and
    said aerospace component is a propeller.

2. The mechanical connection as set forth in claim 1, wherein reinforcement is provided by the axial end of one of said tubular portion and said first and second diaphragm members being radially within the axial end of the other of said tubular portion and one of said first and second diaphragm members.

3. The mechanical connection as set forth in claim 1, wherein a separate reinforcement sleeve provides reinforcement.

4. The mechanical system as set forth in claim 1, wherein said connection receives reinforcement.

5. The mechanical system as set forth in claim 4, wherein said reinforcement is provided by the axial end of one of said tubular portion and said first and second diaphragm members being radially within the axial end of the other of said tubular portion and one of said first and second diaphragm members.

6. The mechanical system as set forth in claim 4, wherein a separate fiber-reinforced polymer matrix composite sleeve provides said reinforcement.

7. The mechanical system as set forth in claim 6, wherein said sleeve provides a radially extending step such that said sleeve has reinforcement portions at distinct radial positions.

8. The mechanical system as set forth in claim 7, wherein said sleeve is radially inward of said joints.

9. The mechanical system as set forth in claim 6, wherein said sleeve is radially inward of said joints.

10. The mechanical system as set forth in claim 9, wherein a second sleeve is provided at a radially outer surface of said joints.

11. The mechanical system as set forth in claim 6, wherein said sleeve is provided on a radially inner surface of said joints.

12. The mechanical system as set forth in claim 1, wherein said at least one undulation extends radially outwardly of said ends.

13. The mechanical system as set forth in claim 1, wherein said at least one undulation extends radially inwardly of said ends.

14. A mechanical system for an aerospace application comprising:
    a drive input connected to a first axial end of a first diaphragm member, and a drive output connected to a second axial end of a second diaphragm member, and said drive output is an aerospace component;
    said first and second diaphragm members being formed with two axial ends and at least one undulation extending radially of said axial ends, and said at least one undulation being intermediate said ends, and a tubular portion connecting said first and second diaphragm members, said first and second diaphragm members and said tubular member being formed of fiber reinforced polymer matrix composites, and said first and second diaphragm members being connected to axial ends of said tubular member;
    joints formed by welding of said axial ends of said tubular portion to one of said inner ends of each of said first and second diaphragm members;
    wherein said joints receive reinforcement;
    wherein a separate fiber-reinforced polymer matrix composite sleeve provides said reinforcement;
    wherein said sleeve provides a radially extending step such that said sleeve has reinforcement portions at distinct radial positions; and
    wherein said sleeve is radially inward of said joints.

* * * * *